US009810082B2

(12) United States Patent
Calza

(10) Patent No.: US 9,810,082 B2
(45) Date of Patent: Nov. 7, 2017

(54) GAS TURBINE ENGINE FOR AIRCRAFT ENGINE

(75) Inventor: Paolo Calza, Arco (IT)

(73) Assignee: GE AVIO S.R.L., Rivalta di Torino (IT)

( * ) Notice: Subject to any disclaimer, the term of this patent is extended or adjusted under 35 U.S.C. 154(b) by 718 days.

(21) Appl. No.: 14/236,762

(22) PCT Filed: Aug. 3, 2012

(86) PCT No.: PCT/IB2012/053997
§ 371 (c)(1),
(2), (4) Date: Sep. 19, 2014

(87) PCT Pub. No.: WO2013/018073
PCT Pub. Date: Feb. 7, 2013

(65) Prior Publication Data
US 2015/0078908 A1 Mar. 19, 2015

(30) Foreign Application Priority Data
Aug. 4, 2011 (IT) .............................. TO2011A0728

(51) Int. Cl.
F01D 9/04 (2006.01)
F01D 25/06 (2006.01)
F01D 5/14 (2006.01)

(52) U.S. Cl.
CPC .............. F01D 9/041 (2013.01); F01D 5/14 (2013.01); F01D 9/04 (2013.01); F01D 25/06 (2013.01);
(Continued)

(58) Field of Classification Search
CPC . F01D 9/04; F01D 9/041; F01D 25/06; F05D 2240/12; F05D 2240/121;
(Continued)

(56) References Cited

U.S. PATENT DOCUMENTS 2,839,239 A * 6/1958 Stalker .................... F04D 21/00
415/181
3,704,075 A * 11/1972 Karstensen ............. F01D 9/041
415/131

(Continued)

FOREIGN PATENT DOCUMENTS

DE 10326533 1/2005
EP 0833060 A2 1/1998

(Continued)

OTHER PUBLICATIONS

International Search Report dated Jan. 17, 2013 corresponding to PCT Application No. PCT/IB2012/053997; 5 pages.

(Continued)

Primary Examiner — Christopher Verdier
Assistant Examiner — Christopher R Legendre
(74) Attorney, Agent, or Firm — Ohlandt, Greeley, Ruggiero & Perle, LLP

(57) ABSTRACT

A gas turbine stator for aircraft engines has a blade array with a plurality of blades constituted by a series of first blades and a series of second blades with different geometries; the array is formed by a plurality of sectors, each having an inner portion, an outer portion, at least one first blade and a least one second blade, and each defined by a body made in one piece; a single first blade is alternated with a single second blade for the entire circumference of the stator.

11 Claims, 5 Drawing Sheets

(52) U.S. Cl.
CPC .... *F05D 2240/12* (2013.01); *F05D 2240/129* (2013.01); *F05D 2260/96* (2013.01); *Y02T 50/671* (2013.01)

(58) Field of Classification Search
CPC ......... F05D 2240/122; F05D 2240/123; F05D 2240/124; F05D 2240/129
See application file for complete search history.

(56) References Cited

U.S. PATENT DOCUMENTS

| | | | | |
|---|---|---|---|---|
| 3,883,264 | A * | 5/1975 | Rao | F01D 1/04 415/119 |
| 4,793,770 | A * | 12/1988 | Schonewald | F01D 9/04 415/142 |
| 5,152,661 | A | 10/1992 | Sheets | |
| 6,079,948 | A * | 6/2000 | Sasaki | F01D 5/141 415/191 |
| 7,094,027 | B2 * | 8/2006 | Turner | F01D 5/141 415/194 |
| 7,121,792 | B1 * | 10/2006 | Fessou | F01D 5/141 415/191 |
| 7,234,914 | B2 | 6/2007 | Usab, Jr. et al. | |
| 7,367,775 | B2 * | 5/2008 | Borufka | F01D 5/027 415/119 |
| 8,133,011 | B2 * | 3/2012 | Cortequisse | F01D 5/141 415/119 |
| 8,454,303 | B2 * | 6/2013 | Garcia-Crespo | F01D 9/042 415/137 |
| 9,650,915 | B2 * | 5/2017 | Calza | F01D 25/06 |
| 2006/0275110 | A1 | 12/2006 | Baralon | |
| 2010/0047056 | A1 | 2/2010 | Lee et al. | |
| 2011/0110763 | A1 * | 5/2011 | Tecza | F01D 5/142 415/119 |
| 2011/0171018 | A1 | 7/2011 | Garcia-Crespo | |
| 2013/0051996 | A1 * | 2/2013 | Hoeger | F01D 9/06 415/185 |
| 2013/0094942 | A1 * | 4/2013 | MacKay | F01D 5/141 415/148 |
| 2014/0245741 | A1 * | 9/2014 | He | F01D 5/141 60/746 |
| 2015/0063985 | A1 * | 3/2015 | Richter | F01D 5/142 415/119 |
| 2015/0078908 | A1 * | 3/2015 | Calza | F01D 9/04 416/223 A |
| 2016/0017796 | A1 * | 1/2016 | Xu | F01D 5/143 415/208.2 |
| 2016/0146040 | A1 * | 5/2016 | Simpson | F01D 25/06 60/805 |

FOREIGN PATENT DOCUMENTS

| | | | | |
|---|---|---|---|---|
| EP | 2075413 | | 7/2009 | |
| FR | 2681644 | | 3/1993 | |
| GB | 2115881 | A * | 9/1983 | ............ F01D 5/142 |
| GB | 2475140 | | 5/2011 | |
| JP | 56069405 | A | 6/1981 | |
| JP | H10103002 | A | 4/1998 | |
| JP | 10331791 | A | 12/1998 | |
| JP | 2009162228 | A | 7/2009 | |
| JP | 2011144805 | A | 7/2011 | |

OTHER PUBLICATIONS

Written Opinion dated Jan. 17, 2013 corresponding to PCT Application No. PCT/IB2012/053997; 5 pages.

* cited by examiner

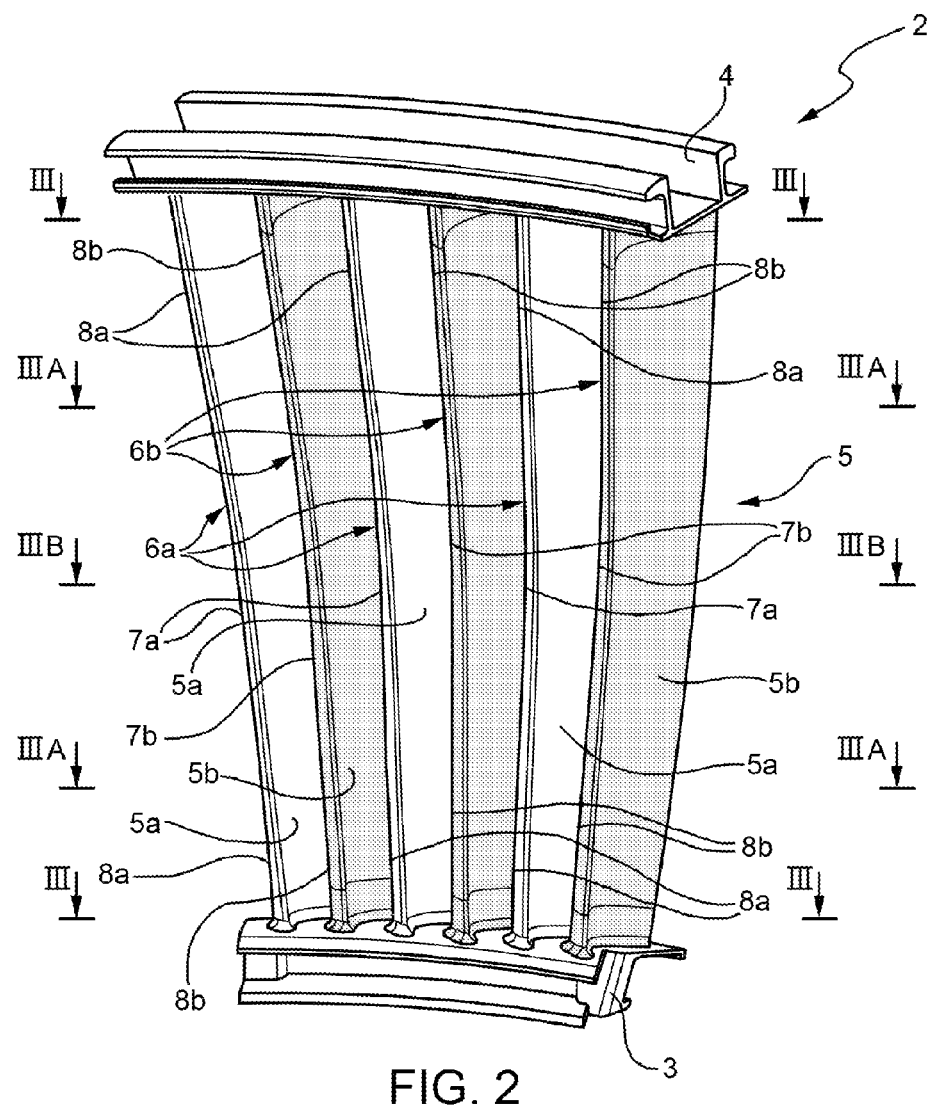
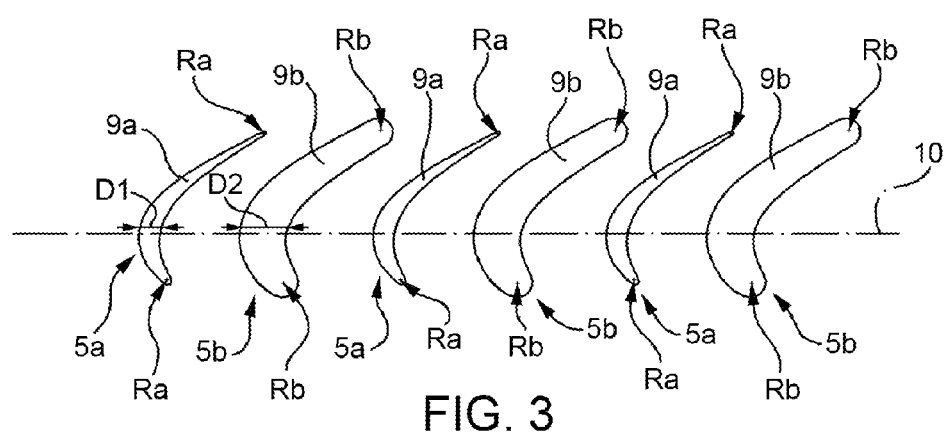

GAS TURBINE ENGINE FOR AIRCRAFT ENGINE

TECHNICAL FIELD

The present invention relates to a gas turbine stator for aircraft engines.

BACKGROUND ART

In the field of gas turbines for aircraft engines there has long been awareness of the need to increase performance by reducing weight as much as possible. In time, this resulted in the construction of stators that, on the one hand, are increasingly subjected to stress, namely high fluid-dynamic loads on the blades and, on the other, have increasingly smaller thickness profiles and therefore inevitably have low rigidity, both flexural and torsional.

The reduced rigidity of the stator blade arrays has, inevitably, resulted in the construction of turbines that have been found to be unstable under certain functional conditions.

It has been possible to experimentally establish that this instability was due to a marked sensitivity to aeroelastic phenomena deriving from reciprocal aerodynamic interactions between the blades of a stage with the consequent triggering of movements or vibrational states, known as "flutter". This flutter stresses the blades, leading them into structurally critical conditions, as well as generating noise emissions.

Owing to these problems, the stator blade arrays were locally reinforced or made more rigid, but at the expense of an inevitable increase in weight and, in any case, the acceptance of geometries/configurations compromised in terms of aerodynamic performance and, consequently, of efficiency.

Patent application EP-A-2075413 teaches to optimize the aerofoils of the stator array. In particular, this array comprises aerofoils that can be different from one another. However, the solution presented in EP-A-2075413 is not very satisfactory with regard to parts assembly, as these parts are numerous and are different from one another. In other words, being made individually with different geometrical characteristics, these parts require dedicated storage and handling systems and different identification codes. In addition, in the assembly step, it is advisable to provide opportune reference and positioning systems to mount the various aerofoils in the correct position, as set by design.

Furthermore, in EP-A-2075413, the particular type of alternation of the aerofoils along the circumferential direction is not optimal from the standpoint of flutter stabilization, as it generates significant asymmetry in the blade array.

DISCLOSURE OF INVENTION

The object of the present invention is to provide a stator having constructional characteristics which enable the above-described problems to be resolved in a simple and inexpensive manner.

According to the present invention, a gas turbine stator for aircraft engines is made.

BRIEF DESCRIPTION OF THE DRAWINGS

The invention will now be described with reference to the attached drawings, which illustrate some non-limitative embodiments, where:

FIGS. 2 and 3 respectively show, on a much larger scale, a perspective view and a sectional view along the lines III-III of FIG. 2 of a first preferred embodiment of a blade sector of the stator in FIG. 1;

BEST MODE FOR CARRYING OUT THE INVENTION

Figure 1:
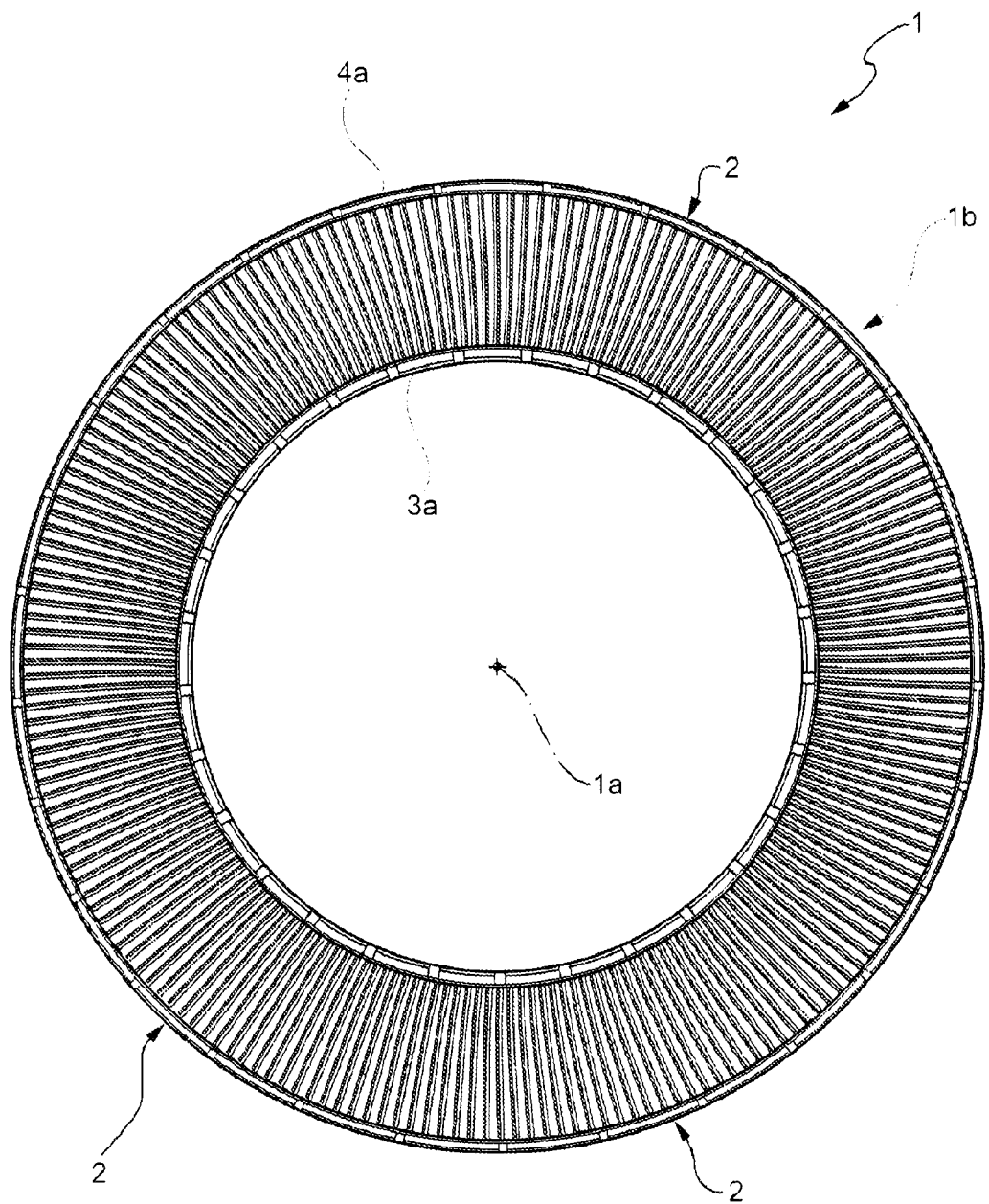
FIG. 1 shows, schematically and substantially in blocks, a stator of a gas turbine equipped with a plurality of blade sectors made according to the principles of the present invention.

In FIG. 1, reference numeral 1 indicates, as a whole, a stator (partially shown) of a gas turbine stage (not shown) for an aircraft engine.

The stator 1 comprises an array or ring 1b formed by a plurality of stator blade sectors 2 arranged next to each other, coaxially to an axis 1a of the array 1b and each comprising an inner curved portion 3, an outer curved portion 4 and at least two intermediate radial blades 5 integrally connected at one end to the inner curved portion 3 and to the outer curved portion 4 at the other end, in order to form, with portions 3 and 4, a monolithic sector 2 made in one piece.

Portions 3 and portions 4 extend around the axis 1a like arcs of a circle and, as mentioned above, rest against and/or are connected to the portions 3 and 4, respectively, of the adjacent sectors 2 in a circumferential direction: taken together, the portions 3 thus form an inner annular end-wall 3a and the portions 4 thus form an outer annular end-wall 4a (FIG. 1). It is evident that the end-walls 3a and 4a radially delimit an annular channel between them, which guides the gas flow in the turbine and houses the blades 5.

With specific reference to FIGS. 2 and 3, each sector 2 comprises two series of blades 5 and, in particular, three blades 5a and three blades 5b geometrically and dimensionally different from each other and alternated one with the other. Alternatively, according to a variant that is not shown, each blade sector 2 comprises only one blade 5a and only one blade 5b.

Each one of the blades 5a and 5b has its own radial generatrix, indicated as 6a and 6b. In the particular example shown in FIG. 2, the generatrices 6a and 6b are at least partially curved and different from each other. Alternatively, according to a variant that is not shown, the generatrices 6a and 6b are straight lines or curved differently from those indicated by way of example.

Always with reference to FIGS. 2, 3, 3a and 3b, the blades 5a and 5b are different from each other and at least partially curved; in the particular example described, they have respective curved intermediate segments, indicated as 7a and 7b and having different curvatures from each other, and respective substantially straight end segments 8a and 8b arranged on opposite ends of the respective curved segments and extending from the respective curved portions 3 and 4.

Figure 3A:
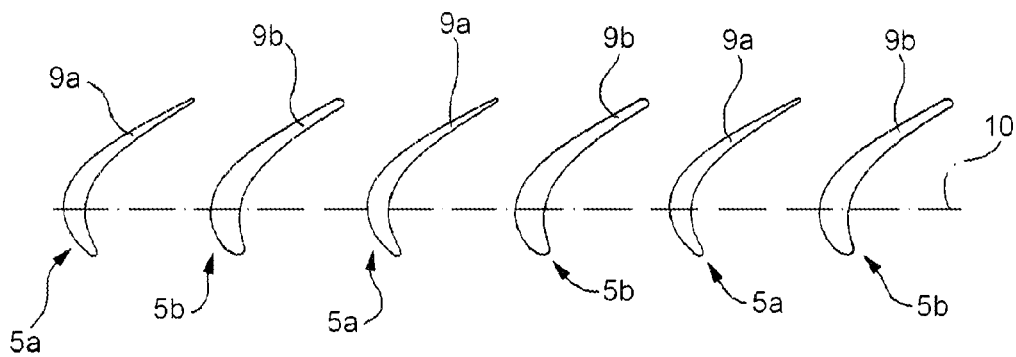
FIGS. 3a and 3b are similar to FIG. 3 and respectively show a sectional view along the lines IIIa-IIIa and along the line IIIb-IIIb of FIG. 2.
Figure 3B:
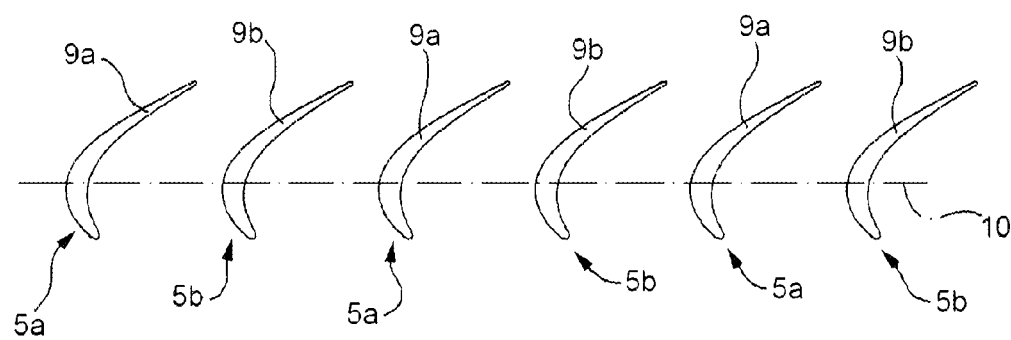

With reference to FIG. 3, the blades 5a and 5b have respective cross-sections 9a and 9b different from each other, both in shape or geometry and in size; blades 5a have sections 9a of substantially constant size in the radial direction, namely going from portion 3 towards portion 4, while blades 5b have variable sections 9b, conveniently varying in an uninterrupted manner, always in the radial direction, as can be clearly seen from the sections shown in FIGS. 3, 3a and 3b. In particular, blades 5b have sections 9a of maximum size dose to portions 3 and 4 (FIG. 3), a section 9a of minimum size at approximately half of the radial extension (FIG. 3b) and intermediate sections 9a in the remaining segments (FIG. 3a). Still with reference to FIG. 3, each of the sections 9a of maximum size has a dimension D1 measured along a circumferential line 10 (FIG. 3) much smaller than a dimension D2 of the sections 9b measured in the same direction and, in particular, equal to or less than half of dimension D2. Not only this, but each of the sections 9a of maximum size has a perimeter with a shape and external dimensions such that it extends completely within the perimeter of each one of sections 9b. In addition, always with reference to FIG. 3, blades 5a have opposite end portions with radii of curvature Ra much smaller than the radii of curvature Rb of the end portions of blades 5b, as clearly visible in FIG. 3.

Figure 4:
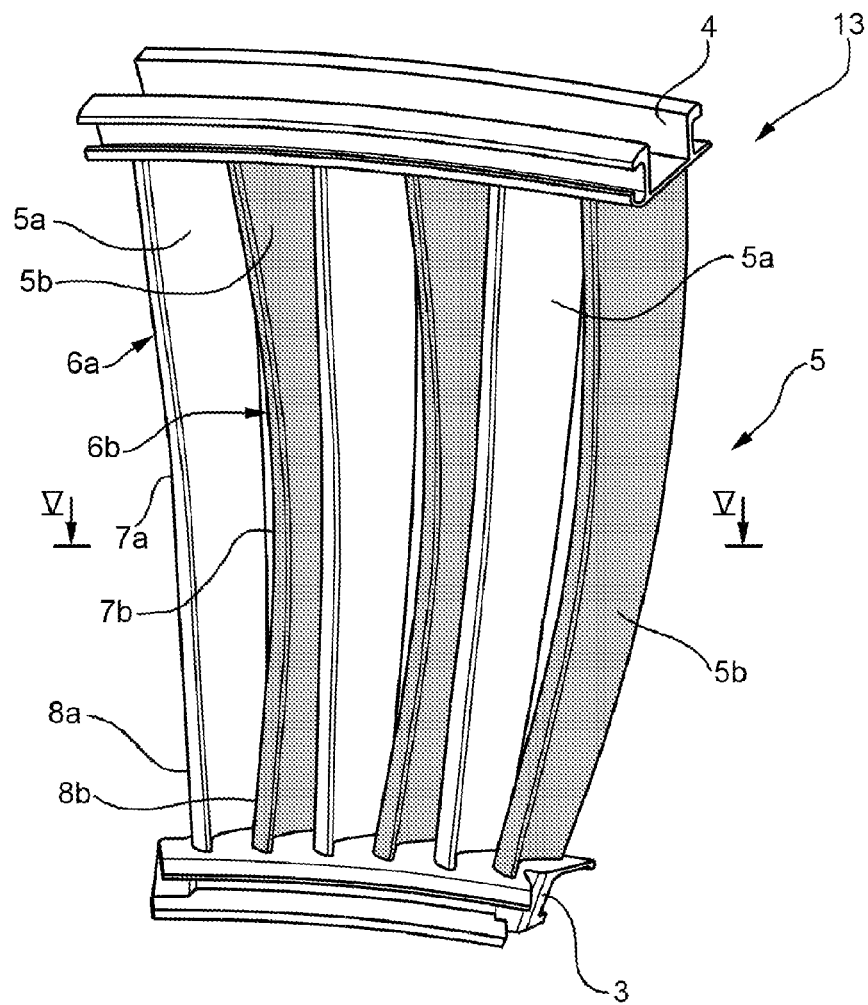
FIGS. 4 and 5 are similar to FIGS. 2 and 3 and respectively show, on a much larger scale, a perspective view and a sectional view along the line V-V of FIG. 4 of a second preferred embodiment of a blade sector of the stator in FIG. 1.
Figure 5:
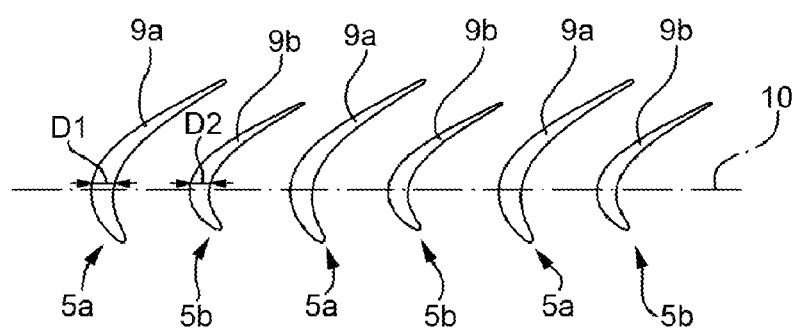

FIGS. 4 and 5 show a blade sector 13 that is similar to blade sector 2 and only differs from blade sector 2 due to the fact that generatrices 6b have greater curvature than generatrices 6a and that the sections 9b of maximum size have a surface and extension in the axial direction smaller than that of sections 9a.

Furthermore, dimensions D1 and D2 are substantially comparable, as can be seen in FIG. 5.

Figure 6:
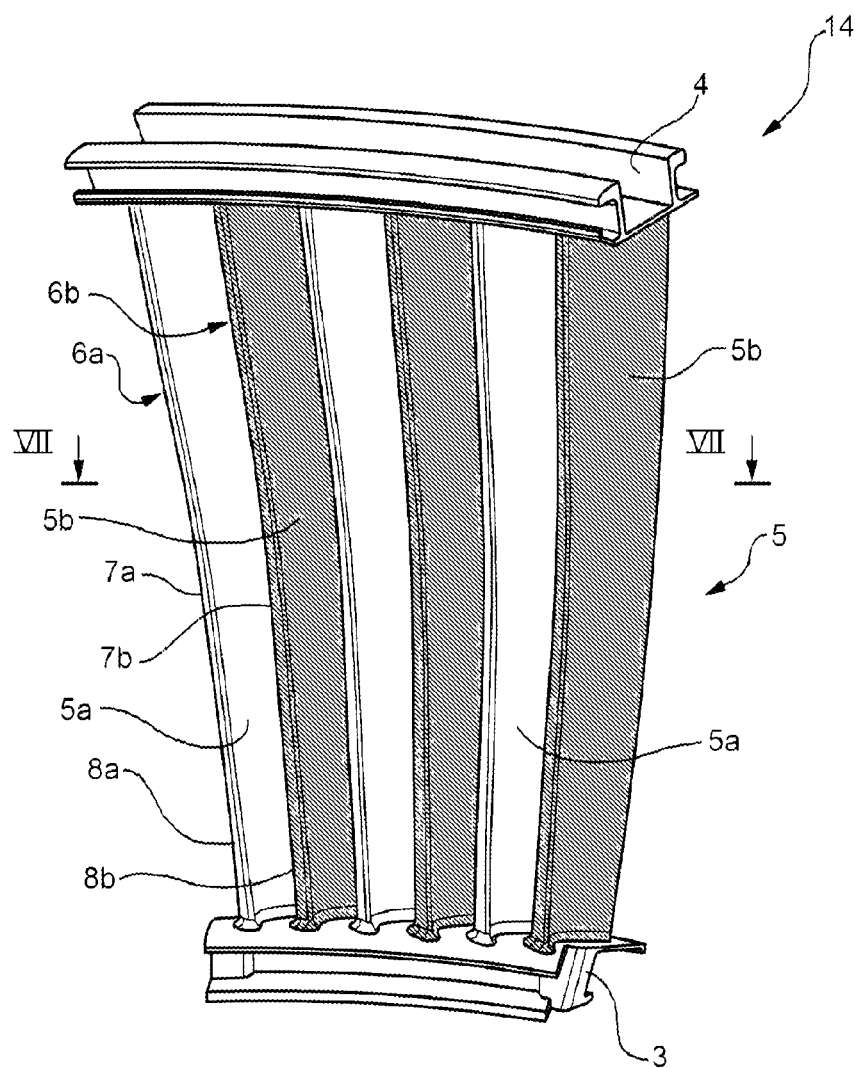
FIGS. 6 and 7 are similar to FIGS. 2 and 3 and respectively show, on a much larger scale, a perspective view and a sectional view along the line VII-VII of FIG. 6 of a third preferred embodiment of a blade sector of the stator in FIG. 1.
Figure 7:
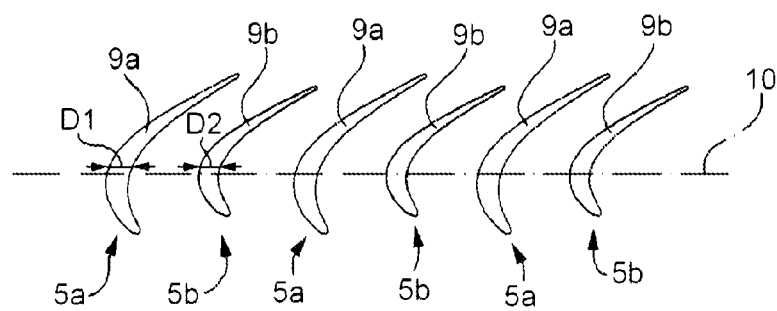

FIGS. 6 and 7 show a blade sector 14 that differs from blade sector 13 solely for the fact that the generatrices 6a and 6b have a different curvature and, in particular, less than that of the generatrices 6a and 6b of sector 13.

It has been possible to experimentally observe that the use of different series of blades on a same monolithic blade sector and, in particular, the use of blades geometrically and dimensionally different from each other or arranged in different relative positions along the inner and outer portions enables creating a blade sector that is aeroelastically stable in any functional or load condition and, at the same time, is extremely light.

The foregoing results from the fact that in the described stator sectors 2, 13 and 14, each of the blades of the same sector, precisely by having a different generatrix, section and, in general, a different geometry from the other blades of the sector and/or by being arranged in a certain position with respect to the other blades, elastically deforms and vibrates or flutters in its own way and with its own frequencies that are different from the modes of vibration or fluttering of the other series of blades that constitute part of the same sector.

In particular, in the design phase, the geometry and the relative layout of the blades of a same sector are determined such that the aerodynamic interactions between the different blades are reduced to the point of reciprocally cancelling each other, rendering the relevant sector stable. In other words, the geometries and relative layouts are determined so as to "detune" the frequencies of the critical vibration modes of each blade, i.e. so as to reduce the aerodynamic iterations caused by adjacent blades.

By making the sectors in a single piece, each one comprising at least one blade 5a and at least one blade 5b, it is possible to produce sectors that are all the same and therefore to produce a kind of module that is repeated along the circumference of the stator in the assembly stage.

Furthermore, the alternation of a single blade 5a with a single blade 5b along the entire circumference of the stator 1 enables reducing the asymmetry of the array 1b to a minimum, so as to optimize flutter stabilization.

From the foregoing, it is clear that modifications and variations can be applied to the described stator 1 without leaving the scope of protection defined in the independent claims. In particular, the generatrices 6a and 6b can have different path from those described by way of example, while all or part of the blade sectors could comprise a number of blades 5 other than that described, but always an even number, as in the illustrated examples, in order to obtain a sector that has an alternation of blades 5a and 5b and is repeated uniformly along the circumference of the stator 1.

Finally, when the generatrices 6a and 6b are straight lines, they could have different radial inclinations from each other.

The invention claimed is:

1. A stator for a gas turbine of an aircraft engine, the stator comprising:
   a blade array comprising a plurality of blades constituted by a series of first blades and a series of second blades, said first blades having a different geometry from said second blades,
   said first and second blades are arranged to alternate a single first blade with a single second blade for the entire circumference of the stator,
   said blade array is defined by a plurality of sectors, each comprising:
   i) an inner curved portion;
   ii) an outer curved portion;
   iii) at least one of said first blades and at least one of said second blades; each of said plurality of sectors is defined by a body made in one piece, wherein the inner curved portions of adjacent sectors form an inner annular end-wall, and wherein the outer curved portions of adjacent sectors form an outer annular end-wall,
   each of said first blades having a first radial generatrix and each of said second blades having a second radial generatrix, said first radial generatrix comprising at least one first curved segment and at least one first straight segment, and said second radial generatrix comprising at least one second curved segment and at least one second straight segment, wherein said first radial generatrix and said second radial generatrix are different from each other.

2. A stator according to claim 1, wherein said first and second curved segments have different curvatures from each other.

3. A stator according to claim 2, wherein said first and second curved segments are intermediate segments.

4. A stator according to claim 3, wherein said first straight segments and said second straight segments are arranged on opposite ends of the respective said first curved segments and said second curved segments.

5. A stator according to claim 4, wherein said first and second straight segments extend from said inner and outer curved portions.

6. A stator according to claim 1, wherein said first and second blades have first and second cross-sections, respectively, which are geometrically or dimensionally different from each other.

7. A stator according to claim 6, wherein said first and second cross-sections have respective dimensions measured along a common circumferential direction that are different from each other.

8. A stator according to claim 7, wherein said first cross-sections have a perimeter that is such that said first cross-sections can be inscribed in a corresponding perimeter of said second cross-sections.

9. A stator according to claim 1, wherein at least said second blades have variable sections in the radial direction.

10. A stator according to claim 9, wherein at least said second blades have sections of maximum size close to said inner and outer curved portions.

11. A stator comprising:
- a plurality of blades constituted by a series of first blades and a series of second blades, said first blades having a different geometry from said second blades, said first and second blades are arranged to alternate a single first blade with a single second blade for the entire circumference of the stator, said blade array is defined by a plurality of sectors, each comprising:
  - i. an inner curved portion;
  - ii. an outer curved portion;
  - iii. at least one of said first blades and at least one of said second blades,
- each said sector is defined by a body made in one piece, wherein the inner curved portions of adjacent sectors form an inner annular end-wall, and wherein the outer curved portions of adjacent sectors form an outer annular end-wall,
- each first blade of said series of first blades having a first radial generatrix and each second blade of said series of second blades having a second radial generatrix, the first radial generatrix comprising at least one first curved segment, and the second radial generatrix comprising at least one a second curved segment, each first curved segment having a first curvature and each second curved segment having a second curvature that is different than the first curvature, and the first curvature and the second curvature each having at least a portion that curves in the same direction.

* * * * *